US007840898B2

(12) United States Patent
Hua et al.

(10) Patent No.: US 7,840,898 B2
(45) Date of Patent: Nov. 23, 2010

(54) VIDEO BOOKLET

(75) Inventors: Xian-Sheng Hua, Beijing (CN); Shipeng Li, Redmond, WA (US); Cai-Zhi Zhu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 11/264,357

(22) Filed: Nov. 1, 2005

(65) Prior Publication Data

US 2007/0101268 A1 May 3, 2007

(51) Int. Cl.
*G06F 3/00* (2006.01)
*G06F 3/048* (2006.01)

(52) U.S. Cl. ........................ 715/723; 715/726; 715/744; 715/748; 715/749; 715/838; 382/165; 382/311

(58) Field of Classification Search ................. 715/723, 715/744, 748, 749, 838; 382/165, 311
See application file for complete search history.

(56) References Cited

U.S. PATENT DOCUMENTS

| | | | | |
|---|---|---|---|---|
| 5,274,418 | A * | 12/1993 | Kazami et al. | 355/40 |
| 5,864,366 | A * | 1/1999 | Yeo | 375/240.12 |
| 5,870,754 | A * | 2/1999 | Dimitrova et al. | 1/1 |
| 5,933,548 | A * | 8/1999 | Morisawa | 382/305 |
| 5,999,173 | A * | 12/1999 | Ubillos | 715/724 |
| RE36,535 | E * | 1/2000 | Hicks | 430/21 |
| 6,111,586 | A * | 8/2000 | Ikeda et al. | 345/619 |
| 6,166,735 | A * | 12/2000 | Dom et al. | 715/749 |
| 6,263,507 | B1 * | 7/2001 | Ahmad et al. | 725/134 |
| 6,283,646 | B1 * | 9/2001 | Dellert et al. | 396/564 |
| 6,301,586 | B1 * | 10/2001 | Yang et al. | 1/1 |
| 6,400,378 | B1 * | 6/2002 | Snook | 715/716 |
| 6,453,078 | B2 * | 9/2002 | Bubie et al. | 382/305 |
| 6,477,269 | B1 * | 11/2002 | Brechner | 382/165 |
| 6,535,889 | B1 * | 3/2003 | Headrick et al. | 1/1 |
| 6,571,054 | B1 * | 5/2003 | Tonomura et al. | 386/95 |
| 6,608,563 | B2 * | 8/2003 | Weston et al. | 340/573.1 |
| 6,623,528 | B1 * | 9/2003 | Squilla et al. | 715/202 |
| 6,629,104 | B1 * | 9/2003 | Parulski et al. | 382/307 |
| 6,771,801 | B1 * | 8/2004 | Fisher et al. | 382/112 |
| 6,847,977 | B2 * | 1/2005 | Abajian | 709/223 |
| 6,912,311 | B2 * | 6/2005 | Anderson et al. | 382/209 |
| 6,956,671 | B2 * | 10/2005 | Monty et al. | 358/1.9 |
| 6,976,229 | B1 * | 12/2005 | Balabanovic et al. | 715/838 |
| 6,999,117 | B2 * | 2/2006 | Yamazaki | 348/222.1 |
| 6,999,637 | B1 * | 2/2006 | Anderson et al. | 382/311 |
| 7,012,621 | B2 * | 3/2006 | Crosby et al. | 345/619 |
| 7,142,318 | B2 * | 11/2006 | Lopez et al. | 358/1.15 |
| 7,148,990 | B2 * | 12/2006 | Atkins et al. | 358/1.18 |
| 7,149,957 | B2 * | 12/2006 | Hull et al. | 715/200 |
| 7,167,191 | B2 * | 1/2007 | Hull et al. | 715/748 |

(Continued)

*Primary Examiner*—Steven B Theriault
(74) *Attorney, Agent, or Firm*—Lee & Hayes, PLLC

(57) ABSTRACT

Systems and methods are described for creating a video booklet that allows browsing and search of a video library. In one implementation, each video in the video library is divided into segments. Each segment is represented by a thumbnail image. Signatures of the representative thumbnails are extracted and stored in a database. The thumbnail images are then printed into an artistic paper booklet. A user can photograph one of the thumbnails in the paper booklet to automatically play the video segment corresponding to the thumbnail. Active shape modeling is used to identify and restore the photo information to the form of a thumbnail image from which a signature can be extracted for comparison with the database.

18 Claims, 12 Drawing Sheets

U.S. PATENT DOCUMENTS

| | | | | |
|---|---|---|---|---|
| 7,174,055 | B2 * | 2/2007 | Hori et al. | 382/305 |
| RE39,524 | E * | 3/2007 | McIntyre et al. | 348/64 |
| 7,216,295 | B2 * | 5/2007 | Wu et al. | 715/203 |
| 7,359,617 | B2 * | 4/2008 | Ma | 386/52 |
| 7,362,946 | B1 * | 4/2008 | Kowald | 386/52 |
| 7,376,290 | B2 * | 5/2008 | Anderson et al. | 382/311 |
| 7,440,593 | B1 * | 10/2008 | Steinberg et al. | 382/118 |
| 7,450,734 | B2 * | 11/2008 | Rodriguez et al. | 382/100 |
| 7,495,795 | B2 * | 2/2009 | Graham et al. | 358/1.18 |
| 7,525,675 | B2 * | 4/2009 | Shelton et al. | 358/1.13 |
| 7,546,528 | B2 * | 6/2009 | Barrus et al. | 715/255 |
| 7,580,164 | B2 * | 8/2009 | Barrus et al. | 358/474 |
| 7,593,915 | B2 * | 9/2009 | Fano et al. | 1/1 |
| 7,596,755 | B2 * | 9/2009 | Graham | 715/723 |
| 7,675,635 | B2 * | 3/2010 | Tsue et al. | 358/1.13 |
| 7,739,583 | B2 * | 6/2010 | Barrus et al. | 715/201 |
| 2001/0048447 | A1 * | 12/2001 | Jogo | 345/620 |
| 2002/0048413 | A1 * | 4/2002 | Kusunoki | 382/282 |
| 2002/0135618 | A1 * | 9/2002 | Maes et al. | 345/767 |
| 2003/0025951 | A1 * | 2/2003 | Pollard et al. | 358/505 |
| 2003/0028451 | A1 * | 2/2003 | Ananian | 705/27 |
| 2003/0033347 | A1 * | 2/2003 | Bolle et al. | 709/107 |
| 2003/0046241 | A1 * | 3/2003 | Toshikage et al. | 705/52 |
| 2003/0167447 | A1 * | 9/2003 | Hatta et al. | 715/517 |
| 2004/0128308 | A1 * | 7/2004 | Obrador | 707/102 |
| 2004/0181747 | A1 * | 9/2004 | Hull et al. | 715/500.1 |
| 2004/0193697 | A1 * | 9/2004 | Grosvenor et al. | 709/217 |
| 2005/0008221 | A1 * | 1/2005 | Hull et al. | 382/161 |
| 2005/0091596 | A1 * | 4/2005 | Anthony et al. | 715/712 |
| 2005/0219665 | A1 * | 10/2005 | Mino | 358/537 |
| 2005/0229092 | A1 * | 10/2005 | Hull et al. | 715/500 |
| 2005/0271782 | A1 * | 12/2005 | Churnick | 426/383 |
| 2005/0283741 | A1 * | 12/2005 | Balabanovic et al. | 715/838 |
| 2006/0064716 | A1 * | 3/2006 | Sull et al. | 725/37 |
| 2006/0117356 | A1 * | 6/2006 | Jojic et al. | 725/88 |
| 2006/0129924 | A1 * | 6/2006 | Nelson et al. | 715/530 |
| 2007/0050718 | A1 * | 3/2007 | Moore et al. | 715/744 |
| 2007/0177805 | A1 * | 8/2007 | Gallagher | 382/190 |
| 2007/0234214 | A1 * | 10/2007 | Lovejoy et al. | 715/719 |
| 2007/0247422 | A1 * | 10/2007 | Vertegaal et al. | 345/156 |

* cited by examiner

902

VIDEO BOOKLET

BACKGROUND

The quantity of multimedia data, such as home videos and digital photo collections, is increasing dramatically in recent years with the popularity of digital cameras and camcorders. Unlike text data, which is relatively easy to index and randomly access, it is much harder to index and efficiently access a home video collection or photo collection.

For average users to search, retrieve and browse their personal media collections can be time-consuming and inconvenient. There are numerous conventional media indexing and browsing systems available, but they have user interfaces that require a computer monitor, keyboard, mouse, and/or remote controller to search for and locate the media content to be viewed on the computer, usually according to navigation hints on the computer screen or TV monitor.

One conventional system prints out a browsing guide for news or meeting video. It enables browsing by placing a bar code for scanning on the printouts. But this conventional system is not natural for easy home browsing of a video library.

SUMMARY

Systems and methods are described for creating a video booklet that allows browsing and search of a video library. In one implementation, each video in the video library is divided into segments. Each segment is represented by a thumbnail image. Signatures of the representative thumbnails are extracted and stored in a database. The thumbnail images are then printed into an artistic paper booklet. A user can photograph one of the thumbnails in the paper booklet to automatically play the video segment corresponding to the thumbnail. Active shape modeling is used to identify and restore the photo information to the form of a thumbnail image from which a signature can be extracted for comparison with the database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Described herein are systems and methods for searching and browsing a library of video recordings, such as homemade video clips. Exemplary systems produce an aesthetically pleasing paper photo album of thumbnails pictures ("video booklet") to represent the scenes of one or more video recordings. Alternatively, the exemplary system may produce a video booklet of thumbnails from a collection of single photos, instead of videos.

Each thumbnail printed in the paper video booklet can then be selected by photographing the thumbnail image with a cell phone camera (or other camera) to retrieve and play back the video scene corresponding to the photographed thumbnail, i.e., on a video player. An entire library of video recordings can be converted to one or more of the paper video booklets, in a variety of pleasing formats. Thus, the video booklet systems and methods described herein offer efficient, natural, and enjoyable personal video browsing and searching.

In an exemplary system, the most representative thumbnail of each video segment (e.g., scene) is digitally selected or produced, and then reshaped by a set of pre-trained personalized shape templates (such as circle, heart, etc.) to be printed out in a paper video booklet album. To browse the content of a digital video library, a user can first browse their paper video booklet in the same manner as one would browse any family photo album printed on paper. Then, to view the video segment represented by a certain thumbnail in the video booklet, the user captures the thumbnail on a camera phone or other easily available imaging device and sends the captured image to a computer, e.g., via wireless network. Thereafter, the stored electronic version of the same target thumbnail is accurately located by a self-training Active Shape Models (ASM) technique and correction of distortion in the captured image, which is seldom absent. Then, the exemplary video booklet system automatically finds and plays back the corresponding video scene. Thus, the exemplary video booklet system offers a seamless bridge between a digital media library and an analog paper video booklet.

Exemplary System

Figure 1:
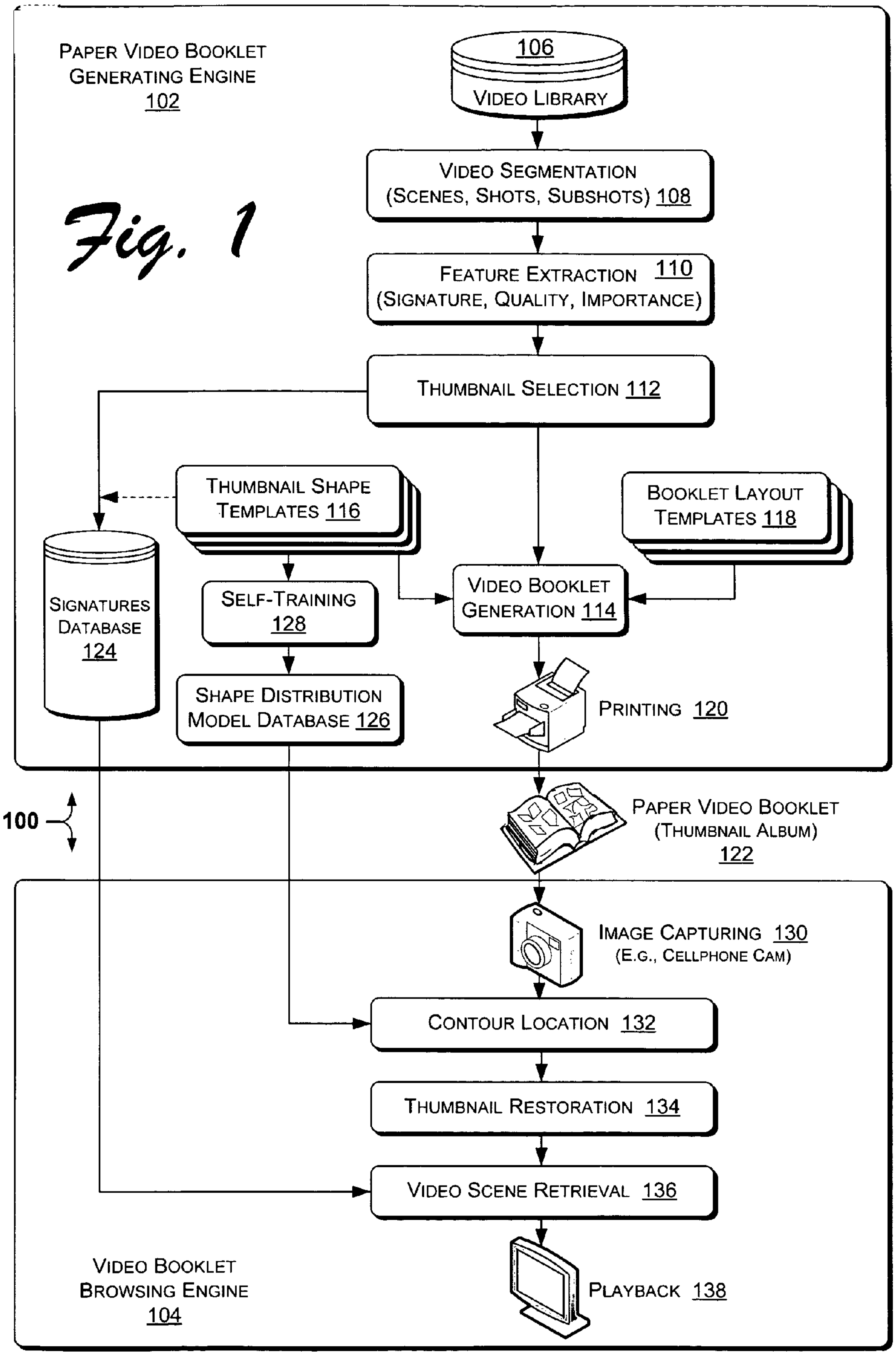
FIG. 1 is a diagram of an exemplary video booklet system.

FIG. 1 shows the exemplary video booklet system 100, introduced above. The exemplary system 100 consists of two sub-systems, a paper video booklet generating engine 102 and a video booklet browsing engine 104. In the video booklet generating engine 102, a video library 106 undergoes video segmentation 108, which segments the video library 106 into scenes, shots and sub-shots. Feature extraction 110 derives a signature, a video quality value, and an attention value (or, "importance" value) for each thumbnail of each sub-shot. Thumbnail selection 112 aims to choose the most representative thumbnail for each scene (a scene being composed of shots, which are in turn composed of sub-shots). In an alternative implementation, if an electronic photo album, such as a collection of JPEG images is being made into the video booklet 120 instead of a video recording, then each digital photo may be considered a shot or a sub-shot.

Video booklet generation 114 uses the temporal structure (scenes, shots, and sub-shots) and the extracted features previously obtained. Using thumbnail shape (contour) templates 116 and booklet layout templates 118, the video booklet generation engine 102, via printing 120, produces a paper video booklet 122 (e.g., using a conventional LaserJet color or black-and-white printer; or developed as a real photo album).

For a given thumbnail selected to represent a video scene, the signature of the thumbnail, including the final shape of the thumbnail, is stored in a signatures database 124 to later identify and/or index the thumbnail for retrieval, when a paper rendition of the thumbnail is captured by a camera. The video booklet generating engine 102 can include a shape distribution model 126 that accommodates new user specified thumbnail shapes by self-training 128.

As mentioned above, the exemplary video booklet system 100 has two sub-systems. The second subsystem is the video booklet browsing engine 104. When a user wants to browse the content of their digital video library, the user can do so by first browsing their paper video booklet 122.

In image capturing 130, when the user wants to view the actual video segment corresponding to a particular thumbnail in the paper video booklet 122, the user takes an informal photograph of the thumbnail using a camera phone, web cam, or other typical and convenient image-capturing device. The captured image is sent to the computer that is hosting the video booklet browsing engine 104, e.g., sent via wireless network. Contour location 132 aims to identify the outline shape of the captured thumbnail image with one of the outlines in the self-trained shape distribution model 126. Thumbnail restoration 134 aims to restore the captured thumbnail to a standard so that a worth signature can be extracted and compared with the signatures 124 of the "ideal" original thumbnails. Once the captured thumbnail image has been identified via matching signatures with a thumbnail known to the exemplary video booklet system 100, then video scene retrieval 136 proceeds to find the video scene(s) in the video library 106 corresponding to the found thumbnail, for playback 128.

Exemplary Engines

Video Booklet Generating Engine

Figure 2:
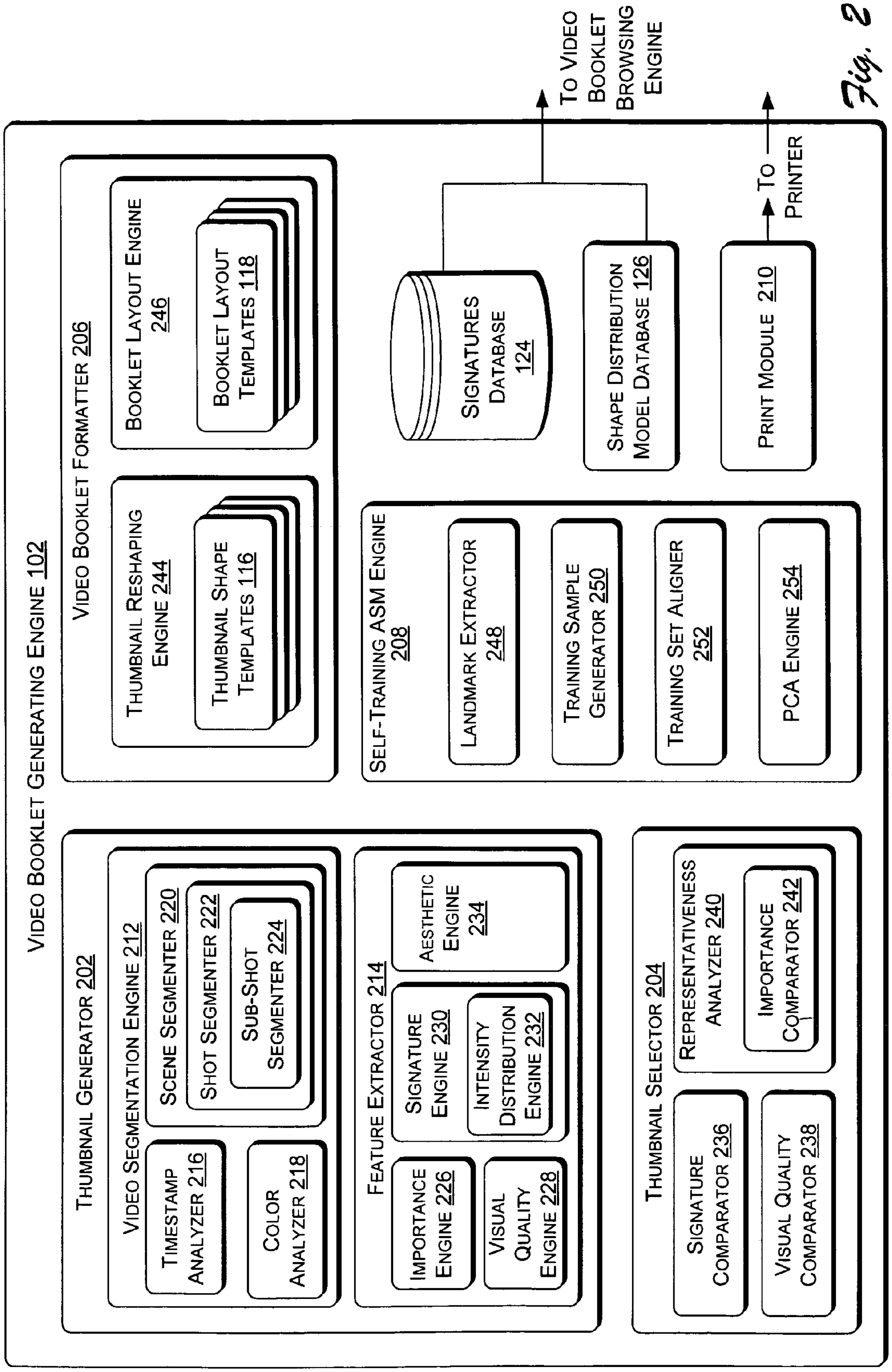
FIG. 2 is a block diagram of an exemplary video booklet generating engine.

FIG. 2 shows the video booklet generating engine 102 of FIG. 1 in greater detail. The illustrated configuration of the exemplary video booklet generating engine 102 is meant to provide only one example arrangement for the sake of overview. Many other arrangements of the illustrated components, or similar components, are possible within the scope of the subject matter. Such an exemplary video booklet generating engine 102 can be executed in hardware, software, or combinations of hardware, software, firmware, etc.

The video booklet generating engine 102 performs many tasks, including selecting an appropriate set of thumbnails to represent a video, organizing the thumbnails into a printout that facilitates an efficient media library search, personalization of the video booklet as an art form, and generating the actual paper booklet.

The exemplary video booklet generating engine 102 includes a thumbnail generator 202, a thumbnail selector 204, a video booklet formatter 206, as well as a self-training ASM engine 208. Other components include the signatures database 124, the shape distribution model 126, and a print module 210.

The aforementioned thumbnail generator 202 may further include a video segmentation engine 212 and a feature extractor 214. The video segmentation engine 212 may include a timestamp analyzer 216, a color analyzer 218, a scene segmenter 220, a shot segmenter 222, and a sub-shot segmenter 224. The feature extractor 214 may include an importance engine 226, a visual quality engine 228, a signature engine 230 (including an intensity distribution engine 232), and an aesthetic engine 234.

The thumbnail selector 204 may further include a signature comparator 236, a visual quality comparator 238, and a representativeness analyzer 240, which may further include an importance comparator 242.

The video booklet formatter 206 may further include a thumbnail reshaping engine 244 that includes the thumbnail shape templates 116, and a booklet layout engine 246, that includes the booklet layout templates 118.

The self-training ASM engine 208 may further include a landmark extractor 248, a training set aligner 250, and a training sample generator 252 that includes a principal component analysis (PCA) engine 254.

Before generating and using the actual paper video booklet 122, content analysis is applied on the entire video library 106 by the video segmentation engine 212, which performs video structuring, and the feature extractor 214. For convenience, however, the exemplary video booklet generating engine 102 is described in terms of processing one video file, but the description is applicable for processing other subsets of the entire video library 106.

In one implementation, the video segmentation engine 212 segments a video into three-layer temporal segments, and thus includes a scene segmenter 220 for delineating large "scene" segments of the video, a shot segmenter 222 for delineating medium "shot" subsegments of the scenes, and a sub-shot segmenter 224 to delineate small "sub-shot" segments of a shot. These components may utilize the color analyzer 218 which finds color dissimilarities, and/or the timestamp analyzer 216, which may differentiate segments according to timestamp, if provided and recognizable. There are also a number of conventional shot boundary detection algorithms. In one implementation, if the videos are analog, the exemplary video segmentation engine 212 uses one as described in Hua, X. S., Lu, L., and Zhang, H. J., "AVE-Automated Home Video Editing," in *Proceedings of ACM Multimedia,* 2004 (the "Hue et al reference"). Otherwise, shot boundaries can be derived directly from discontinuities of timestamps. Accordingly, a video V can be represented as a series of shots, denoted by $V=\{Shot_i, 0 \leqq i < N_{shot}\}$.

In one implementation, the sub-shot segmenter 224 segments each shot into sub-shots that are each equivalent to camera motion detection, which means that one sub-shot corresponds to one unique camera motion. For example, if a shot consists of the camera panning from left to right, then zooming in to a specific object, then panning to the top, and then zooming out and stopping, this shot consists of four sub-shots including one pan to right, one zoom in, one pan to the top, and one zoom out. Thus, the sub-shot segmenter 224 may apply a camera motion detection algorithm such as that in Lan, D. J. et al., "A Novel Motion-based Representation for Video Mining," in *Proceedings of ICME,* 2003.

In one implementation, after delineating the sub-shots of a shot, the sub-shot segmenter 224 then selects the middle frame of each sub-shot as the representative thumbnail (key-frame) of the corresponding sub-shot. Alternatively, other thumbnail selecting schemata may be adopted. The thumbnail pictures to be eventually printed out in the video booklet 120 will be a selected subset of these thumbnails. Then, among the thumbnails representing each sub-shot of a shot, the thumbnail with the longest duration is selected as the thumbnail to represent the corresponding shot. In one implementation, these shot thumbnails are used only for scene grouping. The color analyzer 218 may use a quantized color histogram in HSV space of the thumbnail as the similarity feature for sub-shot and shot comparison, as described in Ma, Y. F., Lu, L., Zhang, H. J., and Li, M., "A User Attention Model for Video Summarization," in *Proceedings of ACM Multimedia*, pp. 795-825, 2002 (the "Ma et al reference").

In one implementation, the scene segmenter 220 may determine scenes by grouping shots. This grouping may be constrained by user input, for example, scene segmentation can be coarse or fine, depending on a user's choices. In other words, a video booklet 120 can be thought of as a scalable representation of the user's video library 106. Each scene is represented by one thumbnail in the printed video booklet 120 album, and the user may designate preferences for such parameters as desired number (or range) of scenes, average duration of the scenes, and similarity of the scenes.

Suppose the video segmentation engine 212 segments a video collection that is to be produced into a paper video booklet 120 into K scenes according to content similarity and timestamp (if available). In particular, the video segmentation engine 212 may define the similarity of any two consecutive shots (or the similarity measure of the "connection point" of these two shots) as the weighted sum of a series of histogram intersections of the shots at the two sides of the "connection point," as shown in Equation (1):

$$Sim_i = Sim(Shot_i, Shot_{i+1}) = \sum_{j=1}^{\delta} \beta_j S_{i,i+j} + \sum_{j=-\delta}^{-1} \beta_{-j} S_{i+j+1,i+1} \quad (1)$$

where $0 \leqq i < N_{shot}-1$. $S_{k,l}$ is the histogram intersection (i.e., color similarity) of $Shot_k$ and $Shot_l$ in HSV space, and the parameter $\beta_j$ is the summing weight defined by Equation (2):

$$\beta_j = \beta^j, 0 < \beta < \delta \quad (1)$$

In this implementation ($\beta = 2/3$, $\delta = 5$).

Scene segmentation is equivalent to finding a set of "cut points" in series $\{Sim_i\}$. If the scene segmenter 220 is constrained by the number of scenes (K), then to delineate a scene, the scene segmenter 220 may "cut" the shot list at "connection point" list θ, while θ is a K-element subset of $\{0, \ldots, N-2\}$, and $\Theta$ is the set of all subsets of this form. "Connection points" in $Sim_i$ whose subscripts are in θ are the "cut points." Then, the scene segmenter 220 groups the shots into K groups by solving the optimization problem in Equation (3):

$$\theta^* = \underset{\theta \in \Theta}{\operatorname{argmin}} \frac{\sum_{j \in \theta} Sim_j}{|\theta|} \quad (3)$$

where $|\theta|$ stands for the number of elements in the finite set θ. In one implementation, the scene segmenter 220 applies the Genetic Algorithm as in Whitley, D. A, "Genetic Algorithm Tutorial," *Statistics and Computing*, Vol. 4, 64-85,1994 to approach a globally optimal solution for this optimization problem. If the scene segmenter 220 is constrained by a user selection of the average scene duration, or by scene similarity, then alternatively, a similar method can be applied. The main difference if an alternative method is applied, is the feasible solution set. Accordingly, a video V can also be represented by $V = \{Scene_i, 0 \leqq i < N_{scene}\}$.

The video can be represented by a series of sub-shots as $V = \{Sub_i, 0 \leqq i < N_{sub})$, where $N_{sub}$ is the number of sub-shots, and the "importance" of each sub-shot is denoted by $a_i$. The feature extractor 214 calculates an "attention" or "importance" value of each sub-shot by averaging the "attention index" of each video frame, in which the attention index is the output of "attention detection" relating to object motion, camera motion, color and speech in the video as described in the Ma et al reference cited above.

In addition, the visual quality engine 228 derives a visual quality measure of $Sub_i$, denoted by $q_i$, from a set of visual features (contrast, gray, and color histogram, etc.), which is similar to the quality measure in the Hua et al reference, cited above.

The signature engine 230 then extracts an ordinal measure of the thumbnail to become the signature of each sub-shot, similar to that described in Hua, X. S., Chen, X. and Zhang, H. J., "Robust Video Signature Based on Ordinal Measure," in *Proceedings of ICIP*, 2004. The intensity distribution engine 232 extracts the ordinal measure by determining the relative intensity distribution within an image, which was first proposed in Mohan, R., "Video sequence matching," in *Proceedings of ICASSP*, 1998, as a robust feature in image correspondence. In one implementation, the signature engine 230 partitions the key-frame (thumbnail) of each sub-shot into $N = N_x \times N_y$ blocks and the average gray level in each block is computed. Then, the intensity distribution engine 232 sorts the set of average intensities in ascending order and assigns a rank to each block (e.g., $N_x = N_y = 5$). The ranked $N_x \times N_y$ dimensional sequence, i.e., the ordinal measure, is the inherent relative intensity distribution in the frame, and thus is naturally robust to color distortion caused by printing and scanning. Furthermore, ordinal measure is a very compact feature vector (25×5/8<16 bytes/sub-shot if the signature engine 230 uses five bits to represent number 0~24).

Figure 3:
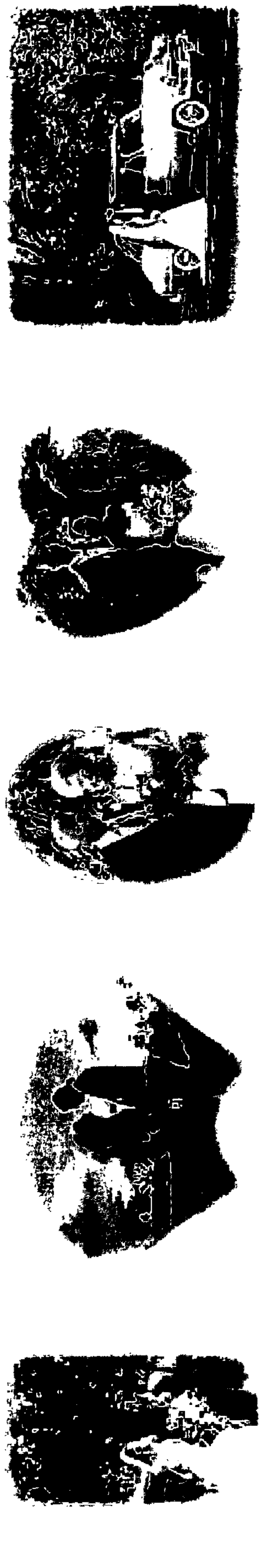
FIG. 3 is a diagram of exemplary thumbnail images artistically printed on paper.

The aesthetic engine 234 extracts a sub-area of each thumbnail called "attention view," denoted by $v_i$, which stands for the most "attractive" area of the thumbnail. Attention view can be applied when generating printout thumbnails within irregular shapes, as shown in FIG. 3. Consequently, a sub-shot $Sub_i$ is represented by a feature vector, as shown in Equation (4):

$$Sub_i = (st_i, et_i, q_i, a_i, s_i, v_i) \quad (4)$$

where $(st_i, et_i)$ is the start and end timestamp, $q_i$ and $a_i$ are visual quality and attention measure, respectively, $s_i$ is the key-frame signature, and $v_i$ is the attention view (a rectangle).

The thumbnail selector 204 selects the "best" set of thumbnails to be printed out in the paper video booklet 120. The thumbnail selector 204 selects one thumbnail for each scene, selected from the sub-shot thumbnails of the scene. Each thumbnail selected by the thumbnail selector 204 is the one that will be printed out in the paper video booklet 120. The components of the thumbnail selector 204 fulfill three objectives. The signature comparator 236 maximizes the signature differences of all the selected thumbnails to reduce the possibility of retrieving the wrong video scene to play back for a selected thumbnail in the video booklet 120. The visual quality comparator 238 maximizes the visual quality of the selected thumbnails. The representativeness analyzer 240 maximizes the representativeness of the thumbnails to be selected for the paper video booklet 120, that is, the importance comparator 242 maximizes the average attention/importance index.

In one implementation, the sub-shots in $Scene_i$ are represented by $\{Sub_{ij} = \{st_{ij}, et_{ij}, q_{ij}, a_{ij}, s_{ij}\}, 0 \leqq j < N_i\}$. The corresponding sub-shot of the selected thumbnail of this scene is denoted by $Sub_{ij(i)}$, where $0 \leqq j(i) < N_i$. Then there are $\Pi N_i$ possible feasible solutions (denoted by $\Theta$). If one of the feasible solutions is denoted by θ, then the signature comparator 236 finds the average signature difference of the selected thumbnails is shown in Equation (5):

$$SD_\theta = \frac{1}{C^2_{N_{scene}}} \sum_{0 \le m < n < N_{scene}} Dist(s_{m,j(m)}, s_{n,j(n)}) \quad (5)$$

where Dist(•,•) is the distance between two signatures defined in Hua, X. S., Chen, X., and Zhang, H. J., "Robust Video Signature Based on Ordinal Measure," in *Proceedings of ICIP,* 2004.

Similarly, the visual quality comparator 238 and the representativeness analyzer 240 maximize average visual quality and representativeness as in Equations (6) and (7), respectively:

$$VQ_\theta = \frac{1}{N_{scene}} \sum_{0 \le i < N_{scene}} q_{j(i)} \quad (6)$$

$$RP_\theta = \frac{1}{N_{scene}} \sum_{0 \le i < N_{scene}} a_{j(i)} \quad (7)$$

Thus, the thumbnail selection problem can be formulated as an optimization problem, as shown in Equation (8):

$$\max F(\theta) = \alpha SD_\theta + \beta VQ_\theta + \gamma RP_\theta \quad (8)$$

where α, β, γ≧0, α+β+γ=1. This is a mathematical programming problem, which can easily be rewritten as a 0-1 programming problem and thus easily solved by the Genetic Algorithm or similar heuristic searching algorithms. In addition, to obtain better results, certain constraints may be added to Equation (8), such as the minimum of $SD_\theta$.

The video booklet formatter 206 defines the overall look-and-feel and the thumbnail layout of the to-be-printed booklet. The thumbnail shape templates 116 enable the thumbnail reshaping engine 244 to reshape the selected thumbnails into irregular forms such as ellipse, heart, sector, and stamp shapes in an artistic style, such as those artistic shape styles shown in FIG. 3.

Figure 4:
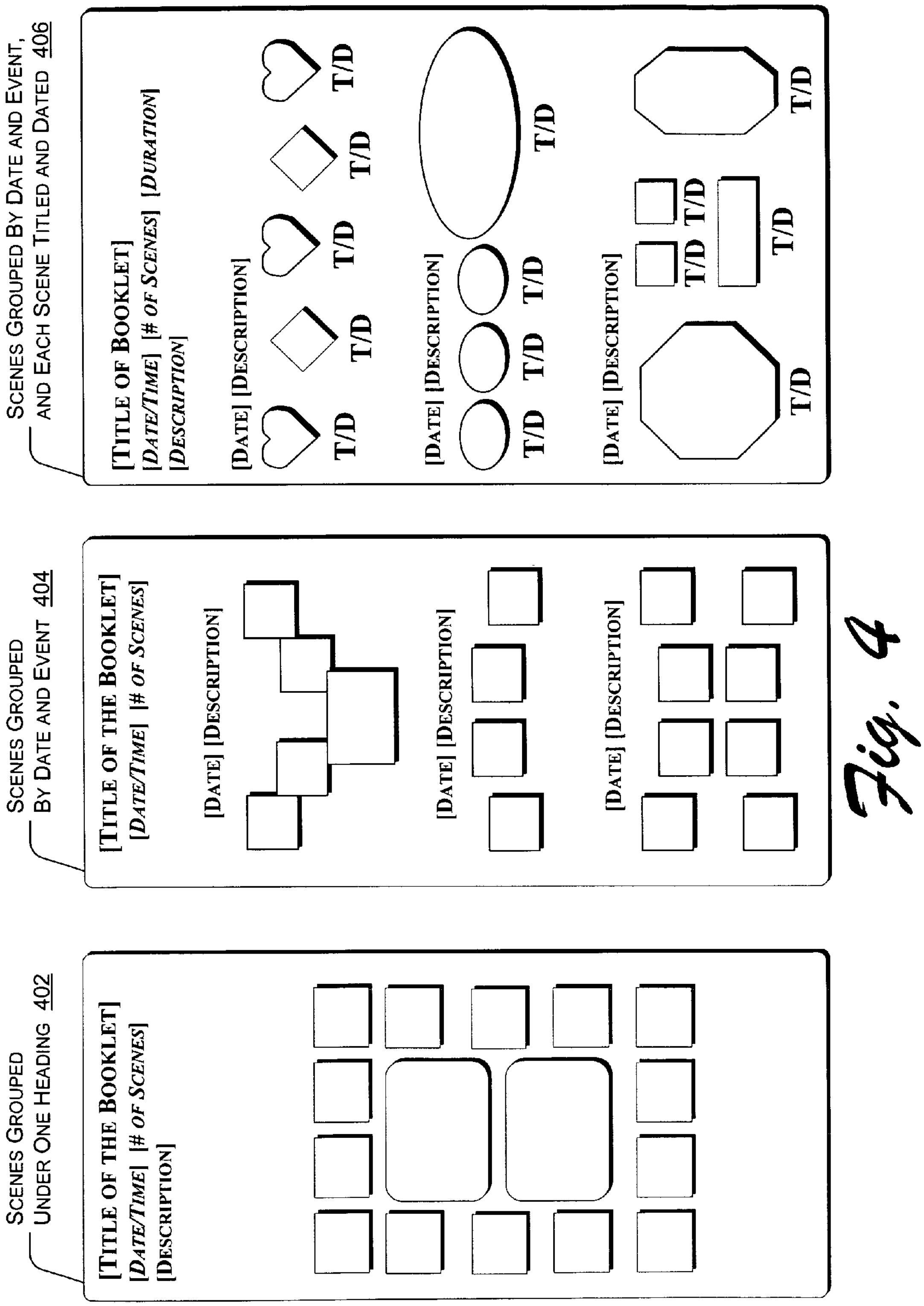
FIG. 4 is a diagram of exemplary booklet layout templates.

To provide impressive printed video booklets 120 in a variety of forms, the booklet layout engine 246 has a series of booklet layout templates 118, such as the exemplary layout templates shown in FIG. 4. With the booklet layout templates 118, for the same selection of thumbnails, the booklet layout engine 246 can generate a set of booklets, each in different form. Different from thumbnail shape templates 116, booklet layout templates 118 mainly affect the layout and look-and-feel of the global thumbnail arrangement on each page of the video booklets 120. While FIG. 3 shows three simple sample booklet layout templates 118, users can design their own templates according to taste, e.g., an ingenious layout for wedding thumbnails that manifests vision and creativity. In one implementation, the booklet layout templates 118 are described by extensible markup language (XML) and can be shared among different users.

Figure 5:
FIG. 5 is a diagram of exemplary contour shapes of exemplary thumbnail images.

The thumbnail reshaping engine 244 helps to generate impressive video booklets 120 in an art-like style, using thumbnail shape templates 116, which enable the video booklet formatter 206 to reshape the selected thumbnails into irregular forms such as ellipse, heart, sector, and stamp shapes, as shown in FIG. 3, and also in FIG. 5.

As it is difficult to precisely locate the contours of the reshaped thumbnails by simple methods such as edge detection and image segmentation, especially when they are sometimes mixed with the background image, the self-training ASM engine 208 may adopt a technique similar to that described in Cootes, T. F., Taylor, C., Cooper, D., and Graham, J., "Active shape models—their training and their applications," in *Computer Vision and Image Understanding,* 61(1):38-59, January 1995. Conventionally, learning-based techniques such as ASM generally require manual acquiring and labeling of training data. The self-training ASM engine 208 provides a substitute for the conventional labeling process. The self-training ASM engine 208 obtains precise shape distribution models 126 for the booklet layout templates 118, which will be applied later by the contour locator to be described below.

Because of the ASM engine 208 is self-training, the video booklet generating engine 102 is able to support a large number of thumbnail shape templates 116 to make a video booklet 120, without any manual labeling required. The exemplary engine 102 also supports user-defined thumbnail shape templates 116. To add a new template, the user only has to draw a sketch, and the self-training ASM engine 208 automatically extracts landmark points, generates a training set, applies PCA, and obtains a shape distribution model 126 for the entered sketch.

Having determined the thumbnail shape templates 116, the video booklet formatter 206 can generate a set of reshaped/cropped thumbnails, such as those shown in FIG. 3, by applying the thumbnail shape templates 116 on a thumbnail selected by the thumbnail selector 204. To automatically obtain better cropped thumbnails, the video booklet formatter 206 may align the cropped area with respect to the shape template 116 with the preferred area of the attention view determined by the aesthetic engine 234. In one implementation, the thumbnail reshaping engine 244 makes the cropped area of a particular thumbnail (with a particular shape template 116) cover as much of the area of the attention view as possible. Some automatically cropped thumbnail samples with artistic shape are shown in FIG. 3, and more creative designs of thumbnail shape templates 116 are shown in FIG. 5.

For each (cropped) thumbnail image to be printed in the video booklet 120, its signature will be extracted by the feature extractor 214 and stored in the signature database 124. In one implementation, to extract the signatures of thumbnails with non-rectangle shape templates 116 applied, the signature engine 230 partitions the thumbnails into blocks, and then only the pixels inside their contour line are averaged.

The self-training ASM engine 208 applies a robust ASM algorithm to locate the contour of the captured thumbnail. Since ASM is a learning-based technique, the ASM engine 208 produces a training set for each template to merge expert knowledge into template matching. In the training phase, given a shape template (for example, those shown in FIGS. 3 and 5) the self-training ASM engine 208 has components to automatically fulfill all the training processes. The landmark extractor 248 extracting landmark points, the training sample generator 252 automatically generates training samples, and the training set aligner 250 aligns the training set and applies principal component analysis (PCA) to obtain the shape distribution model 126.

Figure 6:
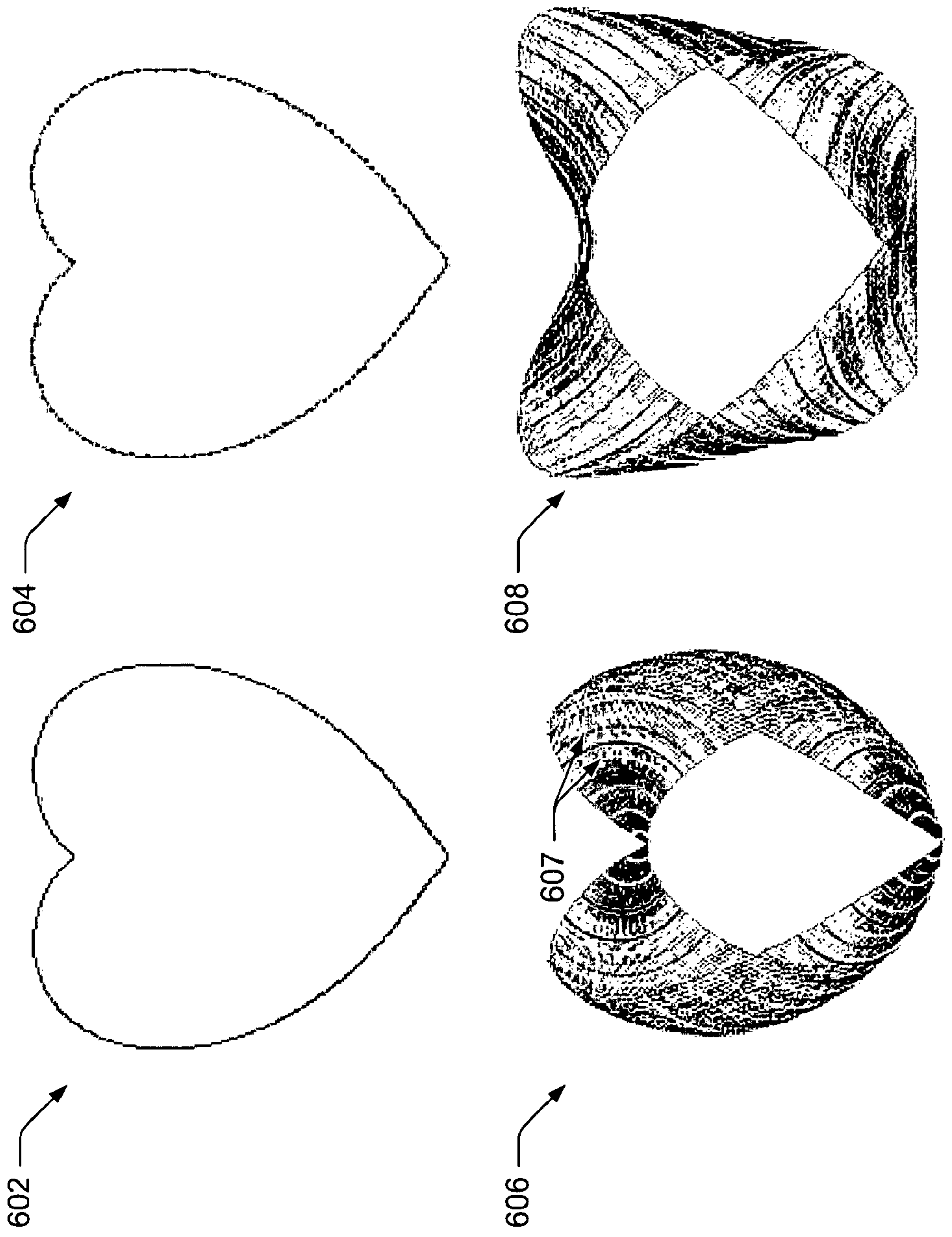
FIG. 6 is a diagram of exemplary generated training samples of a thumbnail shape.

As shown in FIG. 6, a heart-shaped original template 602 is used an example to describe the full process of self-training, but the same process is also applicable to more complex shapes, such as those shown in FIGS. 3 and 5. FIG. 6 shows the original template 602, extracted landmark points 604, generated training samples 606, and aligned training samples 608.

For each original shape template 602, to generate a representation by a set of landmark points, a polyline approximation Douglas-Peucker (DP) algorithm, such as that described in Douglas, D. H., and Peucker, T. K., "Algorithms for the reduction of the number of points required to represent a digitized line of its caricature," *The Canadian Cartographer,* 10:112-122, 1973, is first performed to pick out the most outstanding vertices. Then the landmark extractor 248 can obtain the remainder of the landmark points by interpolation. In one implementation, for the types of shape templates 116 as illustrated in FIGS. 3 and 5, approximately one-hundred landmark points provide a sufficiently precise contour approximation. After these landmark points 604 are extracted, the original shape 116 can be represented as a $2_n$ element vector:

$$X_0=(x_{0,1}, \ldots, x_{0,n}, y_{0,1}, \ldots, y_{0,n})^T \qquad (9)$$

To build a shape distribution model 126 that directs the ASM searching process, the training sample generator 252 may acquire a high number of training samples via numerous experimental runs. Conventionally, the landmark points 604 of each sample are required to be manually labeled. Moreover, to facilitate generating new versions of the shape to match to captured image data, the training set 606 should be general enough to exhibit all expected variation, which is mainly caused by changes in capturing angles and positions. Conventionally, all these factors significantly reduce the practicability of such schemata.

Figure 7:
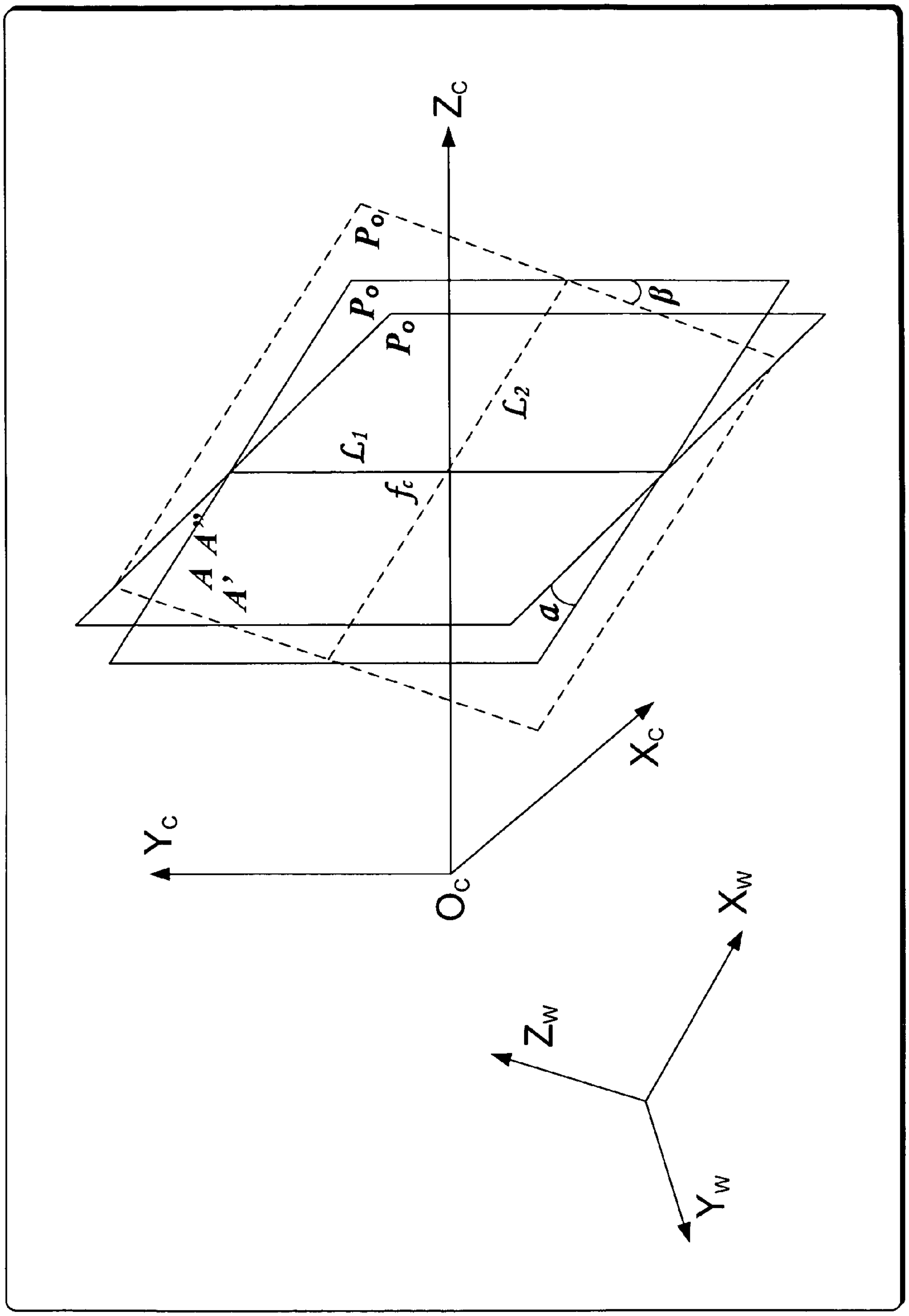
FIG. 7 is a diagram of an exemplary pinhole camera technique.

However, in the exemplary video booklet generating engine 102, the training sample generator 252 automatically generates a training set to simulate numerous possible shape distortions and variations. Since in the exemplary video booklet system 100, thumbnails are typically captured by an ordinary camera located nearby the thumbnail, the "barrel" and "pincushion" distortion existing in the shape can be neglected. Therefore, the possible shape variations can be virtually simulated by having the given 2-dimensional shape yaw and pitch before a pinhole camera, as illustrated in FIG. 7.

Although such a simulation is not precisely identical with distortion that occurs in real cases, error-free matching of a captured thumbnail image with the "ideal" original version of the thumbnail image is obtainable. Thus, the training set of shapes 606 offers an approximation of the real case, and can be estimated by a simplified model due to the following two typical characteristics during thumbnail capturing: first, thumbnails are often centered in the captured images, i.e. the centroids of the thumbnail contours are close to the optical axes of the cameras; and second, the contours of thumbnails generally cover most of the captured images. Thus the field of view (FOV) can be approximated as in Equation (10):

$$FOV_i=2\times\arctan(F_i/(2\times f))\approx 2\times\arctan(B_i/(2\times f)) \qquad (10)$$

where F, B and f denote physical sizes of frame, shape template 116, and focal length, respectively, and i is the selected orientation (horizontal or vertical) as in Equation (11):

$$i=\begin{cases} h, & B_h/F_h > B_v/F_v \\ v, & B_h/F_h < B_v/F_v \end{cases} \qquad (11)$$

The FOV of normal cameras are known and are usually values within a fixed range. Similarly, in a virtual pinhole model, the 2-dimensional original shape of the thumbnail can be positioned perpendicularly to the optical axis with its centroid aligned with the focal length point $f_c$ (see movement of plane $P_0$ in FIG. 7), and from Equation (10) the training sample generator 252 calculates Equation (12):

$$f_c=M_i/(2\tan(FOV_i/2)) \qquad (12)$$

where M and $f_c$ are the size of the shape template 116 and the virtual focal length, respectively (all in pixels). The virtual pinhole model ensures that the projected shape is accordance with the original shape template (e.g., 602) before yawing and pitching the virtual outline. In one implementation, since the training sample generator 252 only considers the shape of the template 602, while ignoring other positional characteristics (rotation, scale and translation), the above operation can be directly performed without transforming from world coordinates $(X_w,Y_w,Z_w)$ to camera coordinates $(X_c, Y_c, Z_c)$.

Thereafter, the training sample generator 252 yaws and pitches the shape template around its centroid to obtain a set of projected shapes simulating the shape variations in real cases. Taking a certain landmark point A(x,y,z) in a shape template 602 as an example ($z=f_c$), the origin $O_c$ is translated to the position $f_c$, i.e., an offset $f_c$ is added to z, to facilitate coordinate transformations as shown in Equations (13) and (14). Next, the training sample generator 252 yaws the template 602 with an angle α round axis $L_1$ and get A'(x', y', z') in plane $P_1$, as shown in FIG. 7 to obtain, as in Equation (13):

$$\begin{cases} x' = x\cos\alpha \\ y' = y \\ z' = x\sin\alpha \end{cases} \qquad (13)$$

Then A' is pitched with an angle α round axis $L_2$ to obtain a new position A"(x", y", z") in plane $P_2$, as in Equation (14):

$$\begin{cases} x'' = x' \\ y'' = y'\cos\beta + z'\sin\beta \\ z'' = z'\cos\beta - y'\sin\beta \end{cases} \qquad (14)$$

The order of yawing and pitching has slight effect on the final result as long as dα and dβ are small. By substituting Equation (13) into Equation (14), and adding $f_c$ to z" to restore the camera coordinates, Equation (15) is obtained:

$$\begin{cases} x'' = x\cos\alpha \\ y'' = x\sin\alpha\sin\beta + y\cos\beta \\ z'' = x\sin\alpha\cos\beta - y'\sin\beta + f_c \end{cases} \qquad (15)$$

Then, the training sample generator 252 can obtain the projected coordinates $(x_i, y_i)$ of A" in the image coordinates system using simple trigonometry, as in Equation (16):

$$\begin{cases} x_i = x'' \cdot z/z'' \\ y_i = y'' \cdot z/z'' \end{cases} \qquad (16)$$

After omitting the constant coefficient z (as it does not affect the shape of the template 602) Equations (12) and (15) are combined into Equation (17):

$$\begin{cases} x_i = x\cos\alpha / (x\sin\alpha\cos\beta - y\sin\beta + M_i / (2\tan(FOV_i/2))) \\ y_i = (x\sin\alpha\sin\beta + y\cos\beta) / (x\sin\alpha\cos\beta - y\sin\beta + M_i / (2\tan(FOV_i/2))) \end{cases} \tag{17}$$

Consequently, for each i ($i\in[0, n]$), a projected point ($x_i$, $y_i$) is obtained from Equation (17). After the training sample generator 252 applies Equation (17) to all landmark points 604 of a shape template 602, it obtains a simulated shape similar to the original shape 602, which is yawed an angle α and then pitched at an angle β before the capturing camera. When this yawing and pitching are repeated throughout a subspace, as in Equation (18):

$$\Omega=\{(\alpha,\beta)\mid -\theta_{y1}\leqq\alpha\leqq\theta_{y2}, -\theta_{p1}\leqq\beta\leqq\theta_{p2}\} \tag{18}$$

with a small step dα and dβ, a simulated training set 606 is finally generated. A small part of simulated training samples 606 for the original heart-shaped template 602 is shown in FIG. 6 (the whole set is too visually dense to be shown). Landmark points generated from same landmark points in the original shape 604 appear as lines or striations in FIG. 6. In one implementation, the parameters used in the above procedure are set (in radians) as in Equation (19):

$$\begin{cases} d\alpha = d\beta = 1/\pi \\ \theta_{y1} = \theta_{y2} = \theta_{p1} = \theta_{p2} = \pi/4 \\ FOV_h = \pi/4.5 \\ FOV_v = \pi/6 \end{cases} \tag{19}$$

Experiments with the training sample generator 252 have shown that the performance of the self-trained models is not sensitive to these parameters. Square and circle-shaped templates can even be used to establish shape distribution models 126 for rectangle and ellipse-shaped templates 116, as long as Ω covers a relatively larger range.

In one implementation, the training set aligner 250 can use an iterative technique for aligning the training set 606, such as the technique described in Cootes, T. F., Taylor, C., Cooper, D., and Graham, J., "Active shape models—their training and their applications," in *Computer Vision and Image Understanding,* 61(1): 38-59, January 1995, with the slight difference that the shape alignment is performed in the tangent space to keep the distribution compact, as well as to minimize non-linearity. In one implementation, the number of iterations to achieve shape alignment is less than five. The aligned training samples 608 resulting from the simulated training sample generation are shown in FIG. 6. The lines of striations resulting from the landmark points are more likely to be collinear after being aligned as compared with the raw generated training samples 606.

An aligned training set 608 consisting of N shapes gives a cloud of N elements, so-called the "Allowable Shape Domain", in a 2n-D tangent space. The axes and their corresponding domain lengths are described by eigenvectors $p_i$ and eigenvalues $\lambda_i$, respectively, where ($1\leqq i\leqq 2n$). Thereafter, the PCA engine 254 obtains the mean shape $\overline{X}$ of the training set 608. PCA is applied to find the principal axes (i.e., PAs) of the domain. The first t axes (t<<2n) denote the most significant modes of the variations spanning in the tangent space. Accordingly a shape distribution model 126, represented by $\overline{X}$, $p_i$ and $\lambda_i$ where ($1\leqq i\leqq t$) is finally obtained.

Figure 8:
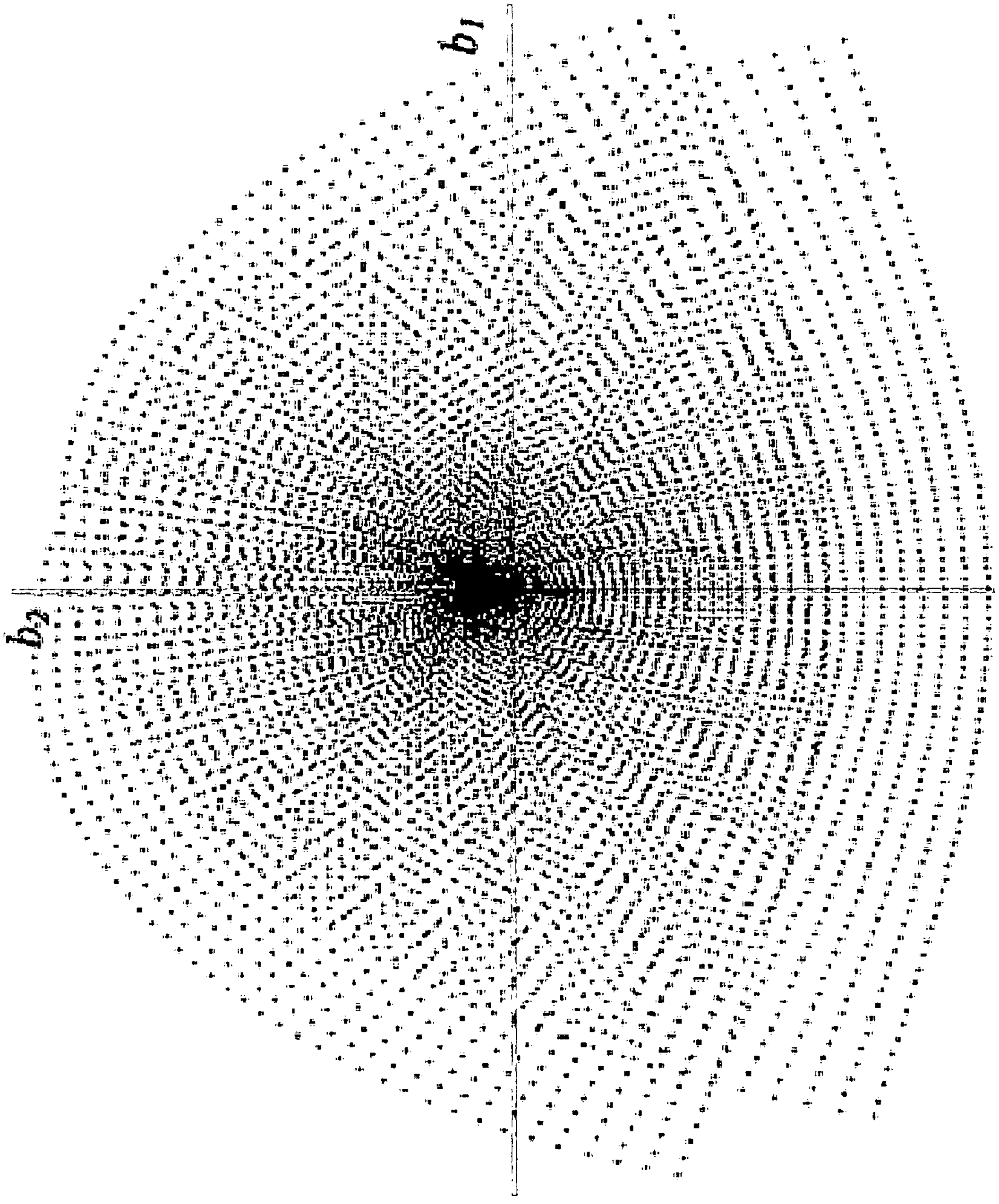
FIG. 8 is a diagram of exemplary correlative shape parameters.

Since shape variations caused by changes in viewing positions are non-linear, the non-linearity cannot be totally eliminated although the shape variations are aligned in tangent space. FIG. 8 shows that the first two shape parameters $b_1$ and $b_2$ are correlative, wherein each point in the reference frame corresponds to a training sample (with component in the first and second PA equal to $b_1$ and $b_2$ respectively). To further reduce the non-linearity, a useful approach is to model the probability density function using an approximation consisting of a mixture of Gaussians to achieve a kernel density estimate of the shape distribution.

Figure 9:
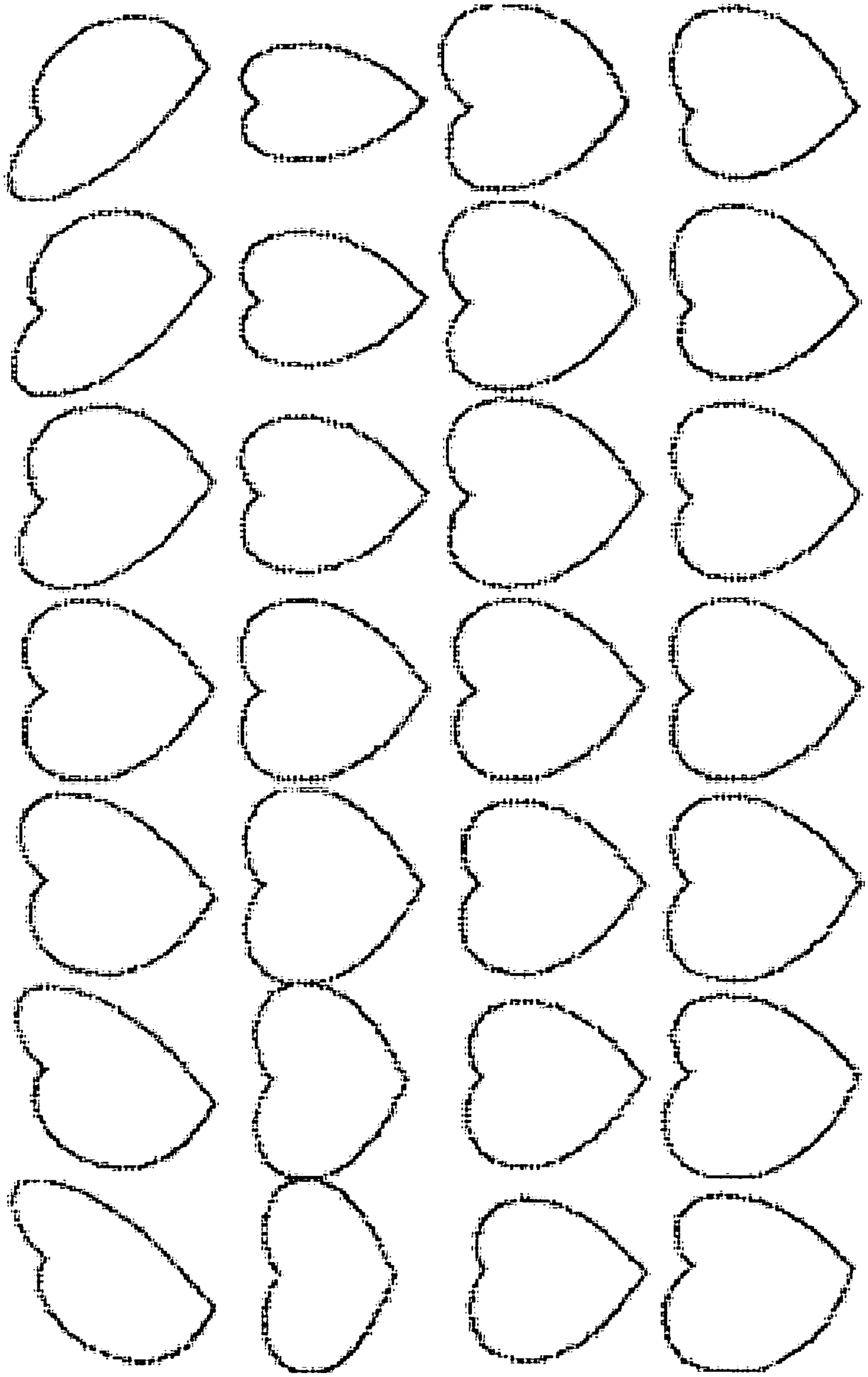
FIG. 9 is a diagram of shape variations obtained by varying corresponding principal axes of a thumbnail shape.

FIG. 9 shows the original heart shape 602 reconstructed by the PCA engine 254, that is, by the first four PCA iterations. In each row, the middle shape 902 is the mean shape, while the other shapes are obtained by varying the corresponding principal axes, e.g., form $-3\sqrt{\lambda_1}$ to $3\sqrt{\lambda_1}$.

Thus, shape variations along the principal axes of the heart shape 602 are illustrated in FIG. 8. An intuitive description for the obtained deformations of the original shape 602 can be offered. The variations of the shape template shown in the first row is explained by the template being yawed and pitched along the first PA; variations in the template shown in the second row result from a series of simulated pitches along the second PA; variations along the third PA result in variations of yaw; and variations along the fourth PA account for other smaller variations. FIG. 8 shows the validity of the simulated training set 606 from a different perspective.

To reiterate, the exemplary self-training ASM engine 208 offers three notable merits. First, the training process is completely automatic. Second, unavoidable human error that may occur in a manual labeling process is not present in the exemplary self-training ASM engine 208. Third, the size of the training set (606; 608) can be arbitrarily large, and the training process is still very efficient (for the shapes shown in FIG. 6, the total computation time is less than one second on a 2.8 Gigahertz computer).

Video Booklet Browsing Engine

Figure 10:
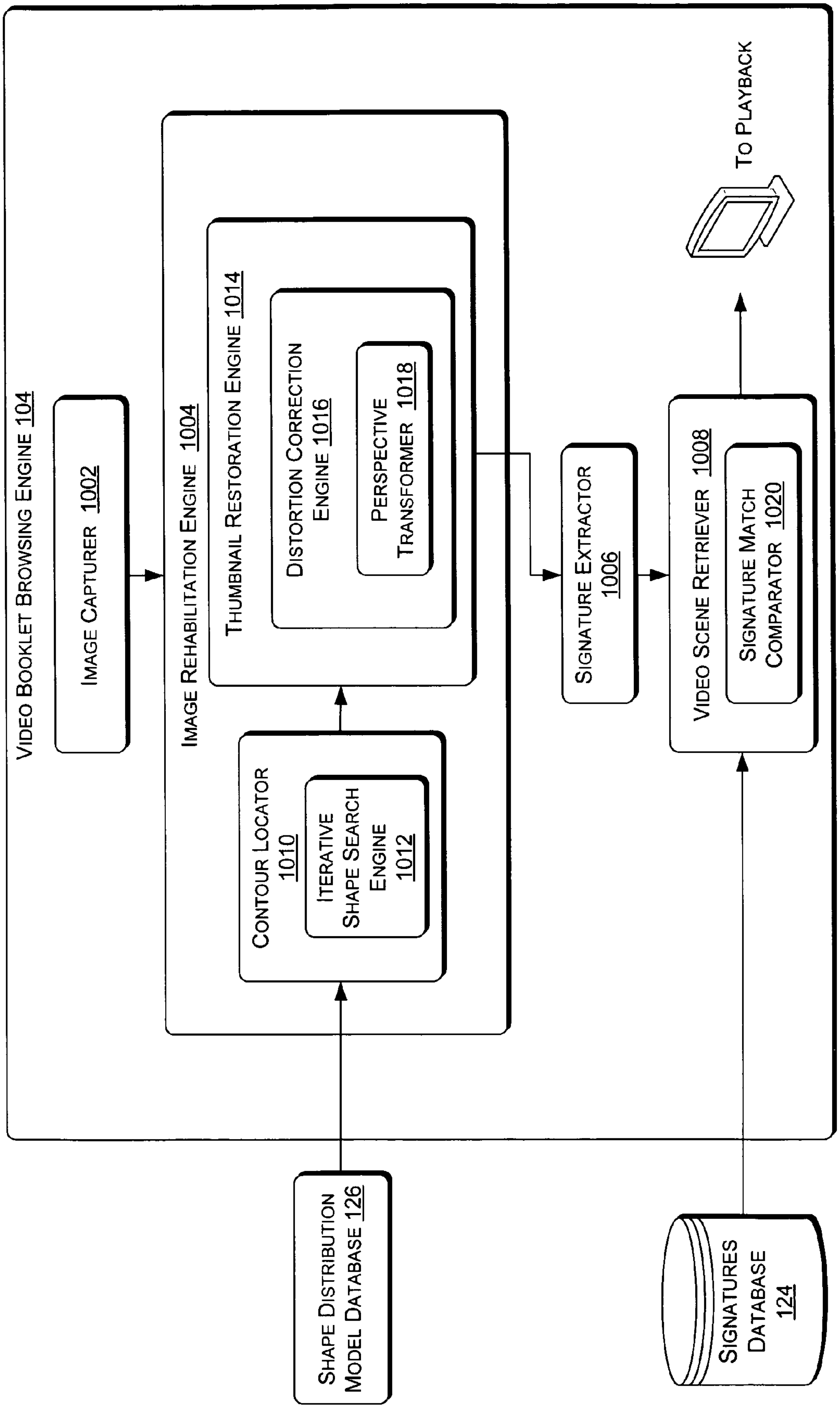
FIG. 10 is a block diagram of an exemplary video booklet browsing engine.

FIG. 10 shows the video booklet browsing engine 104 of FIG. 1 in greater detail. The illustrated configuration of the exemplary video booklet browsing engine 104 is meant to provide only one example arrangement for the sake of overview. Many other arrangements of the illustrated components, or similar components, are possible within the scope of the subject matter. Such an exemplary video booklet browsing engine 104 can be executed in hardware, software, or combinations of hardware, software, firmware, etc.

In the illustrated implementation, the exemplary video booklet browsing engine 104 includes an image capturer 1002, an image rehabilitation engine 1004, a signature extractor 1006, and a video scene retriever 1008. The image rehabilitation engine 1004, in turn, may further include a contour locator 1010, including an iterative shape search engine 1012, and a thumbnail restoration engine 1014, which may further include a distortion correction engine 1016 and a perspective transformer 1018. The video scene retriever 1008 may further include a signature match comparator 1020.

The video booklet browsing engine 104 accomplishes natural and efficient video browsing and searching of the video booklet 120 generated as described above. First, the contour locator 1010 finds the actual contours of the thumbnail captured from the paper video booklet 120 by the image capturer 1002. Then the thumbnail restoration engine 1014 restores the captured image area to its original shape using the perspective transformer 1018. The signature extractor 1006 derives a signature from the reconstituted thumbnail, and finally the thumbnail with the most similar signature in the signatures database 124 is retrieved and the corresponding scene that was being represented by the retrieved thumbnail is transmitted for playback on a display.

Conventional techniques use a hybrid "bottom-up" approach to locate contours of captured thumbnails. This conventional approach detects local structures such as edges, and assembles them into groups in an attempt to identify the objects of interest. But, without a predefined model, this approach often fails to locate more complex shapes, such as badly degenerated thumbnails or thumbnails with colors that are close to the background colors.

The exemplary contour locator 1010 uses a "top-down" approach, which is designed to tackle more general cases. That is, generally, the shape template 116 of a printed thumbnail is either known or constrained to a predefined template set 116. Although the appearance of boundary may be blurred and distorted due to change of viewing position or quality of the captured image, the boundary prototype is often unchanged. So the most straightforward approach to locating boundary is to predefine an exhaustive shape template set 116, and select the best one matched to the test image while simultaneously taking noise and distortion into account. In one implementation a deformable models algorithm, such as the Active Shape Models (ASM) proposed by Cootes, T. F., Taylor, C., Cooper, D., and Graham, J., "Active shape models—their training and their applications," *Computer Vision and Image Understanding,* 61(1):38-59, January 1995. Taking the advantage of shape distribution model 126 generated by the self-training ASM engine 208 can be used for both boundary location and template classification.

With a certain generated shape distribution model 126, the iterative shape searching engine 1012 locates the best contour match of the current template with the captured thumbnail. Alternatively, in some implementations, a similarity search engine that uses grayscale or color histograms to search for a match for the captured thumbnail can be used to augment or replace the iterative shape searching engine 1012.

Figure 11:
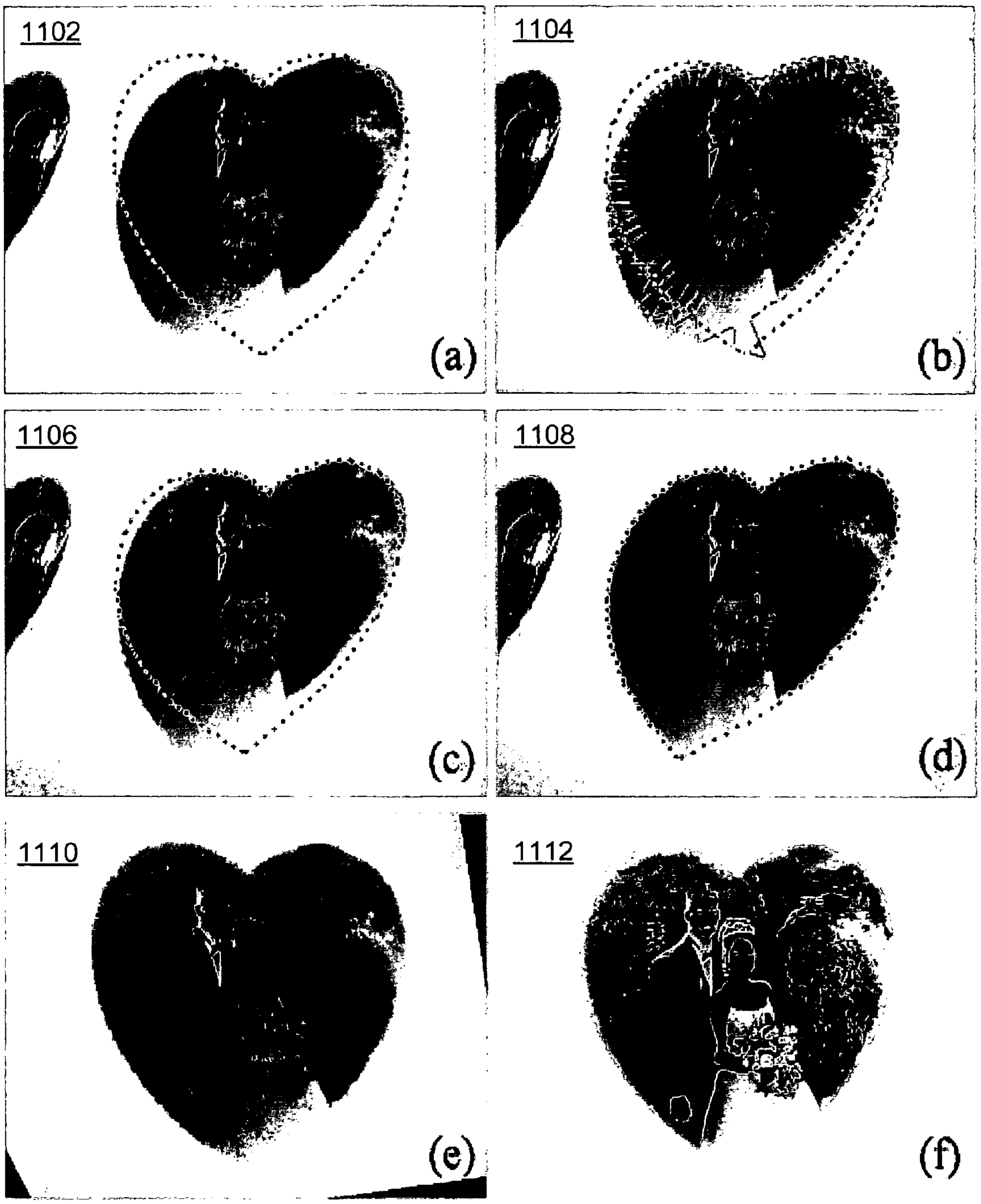
FIG. 11 is a diagram of locating thumbnail contours via iterations of an active shape modeling (ASM) process.

FIG. 11 shows a printed thumbnail, on which the above-described heart-shaped template and a feathering effect are applied, and illustrates the ASM searching process when using the iterative shape searching engine 1012. In parts (a)-(f) of FIG. 11, (a) represents an initial approximation of locating a contour 1102; (b) represents adjusted landmark points (at the 5th iteration) 1104; (c) represents a fitted shape template (at the 5th iteration) 1106; (d) represents a final located result (after 15 iterations) 1108; (e) represents a restored thumbnail image 1110; and (f) represents the original "ideal" version of the thumbnail that was constructed by the video booklet generating engine 102 to be eventually printed out in the video booklet 120.

The contour locator 1010 generates an initial estimation of the template for the captured thumbnail 1102. With prior knowledge that the target thumbnail often lies in the center of the captured image, a rough estimation of the thumbnail contour can be obtained by existing image processing approaches such as a Canny operator. Then the mean shape $\overline{X}$ is positioned at the estimated location as in 1102. Extended experiments have shown that the final contour finding result is actually not sensitive to the initial estimation.

The contour locator 1010 examines the adjustments of each iteration for landmark points. Each landmark point is a base for searching for the best matched point nearby, which has the largest gradient along the normal direction to the boundary in a small range (say, 20 pixels on both sides).

The process of adjustment is shown in FIG. 1104, in which one of the outlines denotes the previous shape, and another outline with dotted white points represents the adjusted contours, while another line denotes the search range.

The contour locator 1010 then fits the shape template 116 to the adjusted boundary. This objective is accomplished by finding the best match for the adjusted contour in the "Allowable Shape Domain." An iterative approach is adopted, and the fitting result of the former figure is given in 1106.

The contour locator 1010 then applies constraints to the matched contour to ensure a plausible shape. In one implementation, the criterion for constraints is the Mahalanobis distance, which performs better than a rough truncation to each shape coefficient. Alternatively, more elaborate algorithms can be used as well.

The iterative shape search engine 1012 repeats the above steps until convergence of the captured contour with a known template. In real implementations, convergence is considered achieved when at least one of the following conditions is satisfied: (a) the number of iterations reaches 50; (b) the template is constrained more than 20 times; or (c) there is no significant change between consecutive iterations, i.e., the maximum coordinate deviation of the landmark points is less than a predefined threshold (e.g., in one implementation is set to 0.4 in our system).

A final contour locating result is shown in 1108. The contour locator 1010 can integrate an ASM algorithm into a multi-resolution framework, through which the search range can be enlarged and the performance can be further improved.

In one implementation, each predefined shape template 116 is applied in the ASM search process, and an efficient criterion is adopted to pick out the best matched contour template 116. The contour locator 1010 first removes those candidate templates whose search processes were forced to stop due to factor (b) above, i.e., the template is constrained more than 20 times during iterations, because the amount of constraining often hints that there is a mismatch. Then the template with the smallest average matching error (between the adjusted landmark points and the fitted ones in the latest iteration) is the fitted template.

The whole process above can be preformed in real time. In one implementation, for a captured image in 640×480 size, and searching among five shape template 116 candidates, the total computation time is less than 0.2 second on a computer with 2.8 gigahertz processor.

Since the thumbnail plane is typically non-perpendicular to the optical axis of the camera, the captured thumbnail is typically distorted. Therefore, the thumbnail shape restoration engine 1014 includes the perspective transformer 1018 to restore a normalized shape, i.e., a corrected perspective. The applied perspective transformation from the captured image $I(x_i, y_i)$ to the template shape image $I_0(u_i, v_i)$ is given by Equation (20):

$$\rho\begin{bmatrix} u_i \\ v_i \\ 1 \end{bmatrix} = \begin{bmatrix} m_{00} & m_{01} & m_{02} \\ m_{10} & m_{11} & m_{12} \\ m_{20} & m_{21} & m_{22} \end{bmatrix}\begin{bmatrix} x_i \\ y_i \\ 1 \end{bmatrix} \tag{20}$$

where ρ is a scalar and $m_{22}=1$. To calculate the perspective transformation coefficients $m_{ij}$ ($0 \leqq i, j \leqq 2$), four coordinates of the corresponding quadrangle vertices are used. Fortunately, landmark points naturally maintain a corresponding relationship between the located shape from the captured image and the template shape from the original thumbnail. The perspective transformer 1018 selects four corresponding vertices from 2n landmark points. In one implementation, the perspective transformer 1018 selects the four outstanding vertices from the shape template 116 by the DP algorithm mentioned above. Given the four corresponding vertices, Equation (20) can be solved by the Singular Value Decomposition (SVD) method. Then the perspective transformer 1018 applies the transformation to the entire located area to obtain the restored shape 1110, as shown in FIG. 11.

Figure 12:
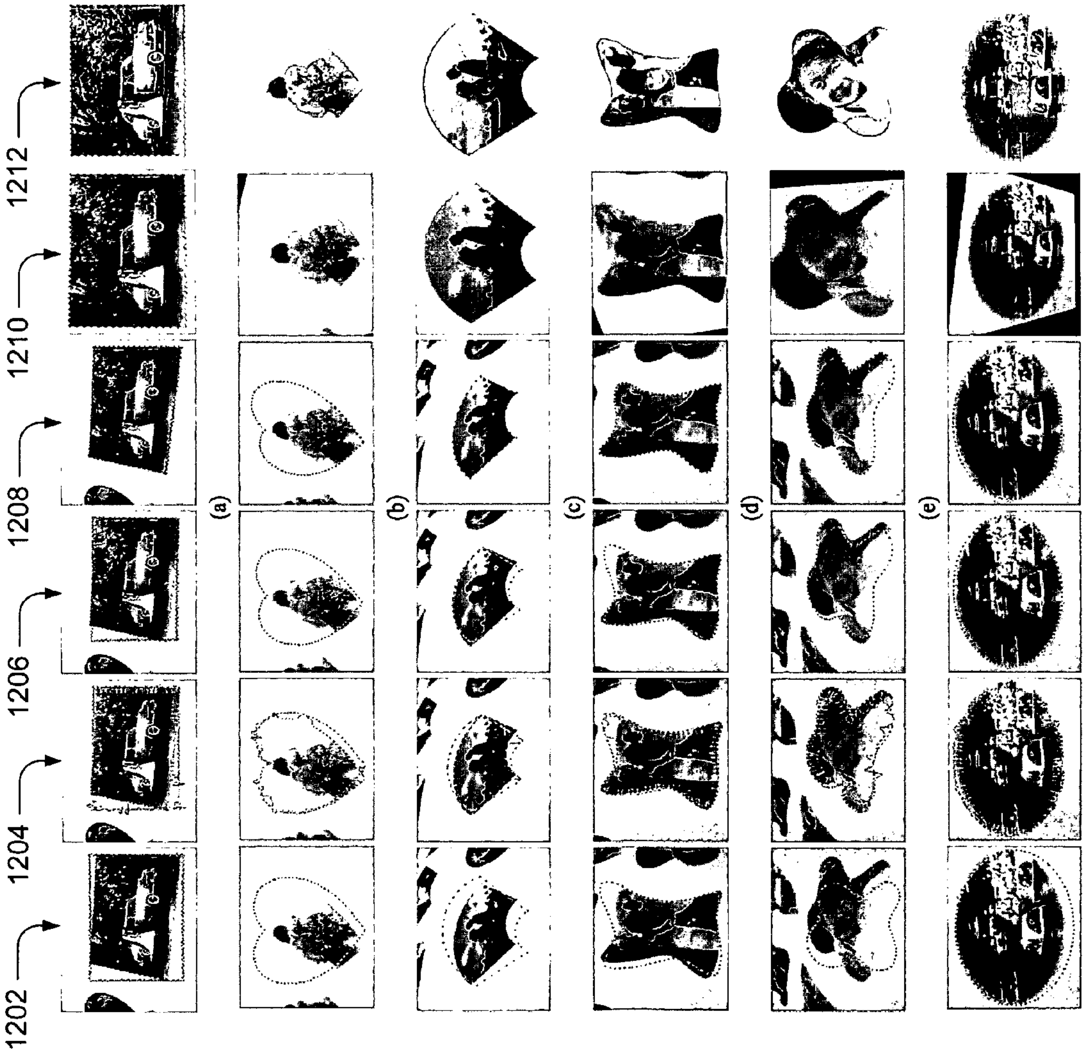
FIG. 12 is a diagram of exemplary active shape model (ASM) searching and thumbnail shape restoration.

FIG. 12 shows additional examples (a)-(e) of ASM searching and shape restoration. In columns from left to right, the first column shows an initial approximation 1202; then adjusted landmark points (in this case, at the 5th iteration) 1204; then a fitted shape template (also at the 5th iteration) 1206; a final located result 1208; a restored thumbnail image 1210; and finally the original thumbnail 1212 retrieved from the restored thumbnail image 1210.

Finally, the signature extractor 1006 derives the signature of the restored thumbnail 1110. The signature match comparator 1020 finds the best match between the extracted signature from the restored thumbnail 1110 and a thumbnail signature in the signatures database 124. Then, the most similar thumbnail in the video library 106 is retrieved and the video scene retriever 1008 plays the corresponding video recording from the beginning of the scene that the retrieved thumbnail represents.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes an exemplary video booklet. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented at least in part by a computing device executing computer-executable instructions stored in storage media, the method comprising:

- dividing a video recording into segments;
- deriving, for each segment, a digital thumbnail image to represent the segment, the digital thumbnail image comprising a photo of a scene of the segment;
- reshaping the thumbnail images using a pre-trained shape template such that each thumbnail image comprises an outline shape contour surrounding the photo;
- storing the digital thumbnail images that represent the segments in a database;
- printing each digital thumbnail image on paper to create a paper collection of thumbnail images;
- receiving one of the printed thumbnail images as digital image information captured by a camera as a result of a user taking a photograph of the printed thumbnail image and providing the photograph of the printed thumbnail image to the computing device;
- identifying the outline shape contour of the thumbnail image using an active shape model search;
- based upon the identification, restoring the thumbnail image to a pre-trained template shape of the digital thumbnail image;
- matching, by the computing device, the photograph of the printed thumbnail image with one of the corresponding digital thumbnail images stored in the database; and
- retrieving and playing, by the computing device, the segment represented by the corresponding digital thumbnail image determined to match the received photograph.

2. The method as recited in claim 1, wherein the dividing the video recording into segments further includes dividing the video recording into scenes, shots, and sub-shots based on one of discontinuities of timestamps, discontinuities of color, discontinuities of intensity, or discontinuities of camera motion.

3. The method as recited in claim 1, wherein the deriving a digital thumbnail image to represent each segment further comprises:

- selecting multiple video frames from the segment to each be a candidate thumbnail image for representing the segment; and
- for each candidate thumbnail image, extracting a digital signature based on an intensity distribution.

4. The method as recited in claim 3, wherein the digital signatures are used for matching the digital image information with one of the corresponding digital thumbnail images.

5. The method as recited in claim 3, wherein the deriving the digital thumbnail image to represent the segment further comprises:

- selecting the candidate thumbnail image that best maximizes signature differences between the representative thumbnail and other representative thumbnails selected to represent other respective segments, based on a comparison between the candidate thumbnail image and the representative thumbnail images selected to represent other respective segments;
- selecting the candidate thumbnail image with the highest visual quality; and
- selecting the candidate thumbnail image that best represents the corresponding segment.

6. The method as recited in claim 5, further comprising storing a signature of each thumbnail image selected to represent a corresponding segment, wherein each segment is capable of being retrieved via the corresponding signature.

7. The method as recited in claim 1, wherein the matching the digital image information with one of the corresponding digital thumbnail images further comprises matching based on grayscale similarities or color similarities between the digital image information and one of the digital thumbnail images.

8. The method as recited in claim 1, wherein restoring the thumbnail image further comprises applying principal component analysis (PCA) to vary the thumbnail shape along one or more principal axes.

9. The method as recited in claim 1, wherein restoring the thumbnail image further comprises applying a perspective transform to the thumbnail image.

10. The method as recited in claim 9, further comprising extracting a signature from the restored thumbnail image to compare with signatures of the digital thumbnail images used to create the paper collection of thumbnail images.

11. The method as recited in claim 1, further comprising dividing a collection of photos into segments instead of the dividing the video recording into segments, wherein each photo in the collection of photos constitutes one of the segments.

12. The method as recited in claim 1, wherein the deriving a digital thumbnail image to represent the segment further includes finding an attractive part of a video frame of the video recording to become the center of the thumbnail image.

13. The method as recited in claim 1, wherein printing each digital thumbnail image on paper to create a paper collection of thumbnail images further includes using one or more booklet layout templates to create an artistic layout of the paper collection of thumbnail images.

14. The method as recited in claim 1, further comprising dividing the video recording into segments according to user-selected segment characteristics.

15. The method as recited in claim 1, further comprising receiving a user-defined shape and then training a shape definition model for the user-defined shape, wherein the shape definition model is used for deriving a digital thumbnail image to represent one of the segments.

16. A method implemented at least in part by a computing device executing computer-executable instructions stored in a storage media, comprising:

- accessing, by the computing device, a video recording of a video collection for segmenting the video recording;
- dividing, by the computing device, the video recording into a plurality of segments by dividing the video recording into scenes, shots, and sub-shots based on one of discontinuities of timestamps, discontinuities of color, discontinuities of intensity, or discontinuities of camera motion;
- representing, by the computing device, each segment of the video recording with a thumbnail image, the thumbnail image comprising a photo of a scene of the segment, wherein the thumbnail image to represent a particular segment is selected by:
  - selecting multiple video frames from the particular segment to each be a candidate thumbnail image for representing the particular segment,
  - for each candidate thumbnail image, extracting a digital signature based on an intensity distribution, and
  - selecting the candidate thumbnail image that best maximizes signature differences between the representative thumbnail and other representative thumbnails selected to represent other respective segments of the video recording, based on a comparison between the candidate thumbnail image and the representative thumbnail images selected to represent other respective segments;
- reshaping the thumbnail images using a pre-trained shape template such that each thumbnail image comprises an outline shape contour surrounding the photo;
- storing, by the computing device, each thumbnail image selected to represent a corresponding segment in a database, wherein each segment of the video recording is capable of being retrieved via the corresponding thumbnail image;
- printing the thumbnail images representing each segment of the video recording onto paper to create a paper collection of the thumbnail images corresponding to the segments of the video recording;
- receiving as input a digitally photographed image of one of the printed thumbnail images printed onto the paper, wherein the digitally photographed image is received by the computing device via a wireless transmission from a photo imaging device including a camera that took the digitally photographed image;
- identifying the outline shape contour of the thumbnail image;
- based upon the identification, restoring the thumbnail image to a pre-trained template shape of the digital thumbnail image;
- matching the digitally photographed image of the one of the printed thumbnail images with a corresponding representative thumbnail image stored in the database; and
- identifying one of the segments of the video recording corresponding to the matching thumbnail image for playing back the segment of the video recording represented by the matching thumbnail image that matches the digitally photographed image, wherein at least one printed thumbnail image is digitally photographed to play back the corresponding segment of the video recording.

17. The method as recited in claim 16, wherein the digitally photographed image of the printed thumbnail image from the paper is manipulated through active shape modeling (ASM) to match with the matching thumbnail image corresponding to the one of the segments.

18. A system, comprising:

- a processor;
- a memory communicatively coupled to the processor, the memory comprising components including:
  - a generating engine component configured for segmenting a video recording into a plurality of segments, representing each video segment with a corresponding digital thumbnail image, the digital thumbnail image comprising a photo of a scene of the segment, reshaping the thumbnail images using a pre-trained shape template such that each thumbnail image comprises an outline shape contour surrounding the photo, storing the digital thumbnail image representing each video segment in a database and printing each digital thumbnail image stored in the database on paper; and
  - a browsing engine component configured for receiving as input a digital photograph of one of the printed thumbnail images as digital image information captured by a camera, identifying the outline shape contour of the thumbnail image using an active shape model search, restoring the thumbnail image to a pre-trained template shape of the digital thumbnail image, and referring to the database to locate a video segment corresponding to the digital image information captured by the camera by matching the digital image information captured by the camera with one of the thumbnail images stored in the database for playing the video segment corresponding to the digital image information captured by the camera.

* * * * *